United States Patent Office 2,941,874
Patented June 21, 1960

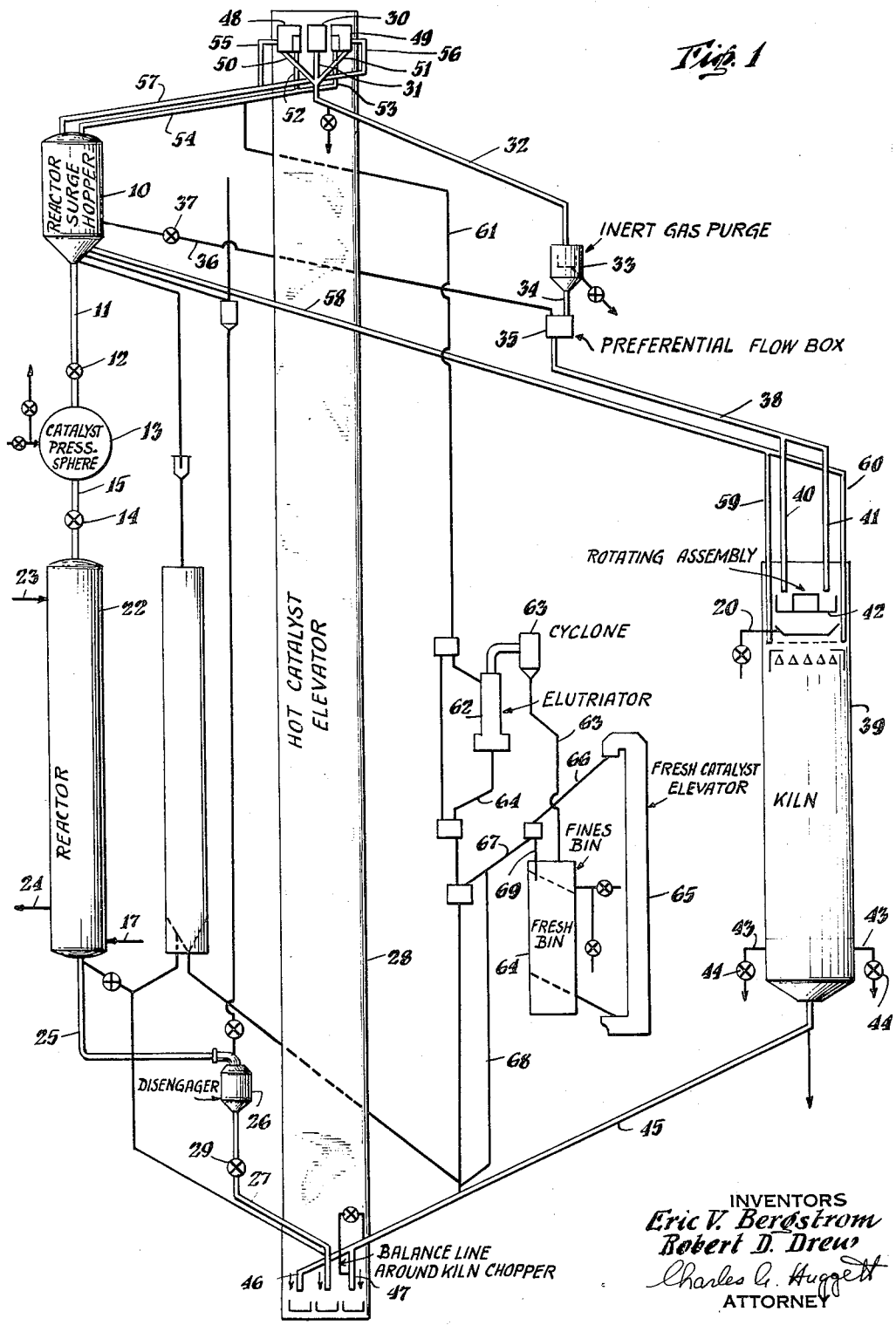

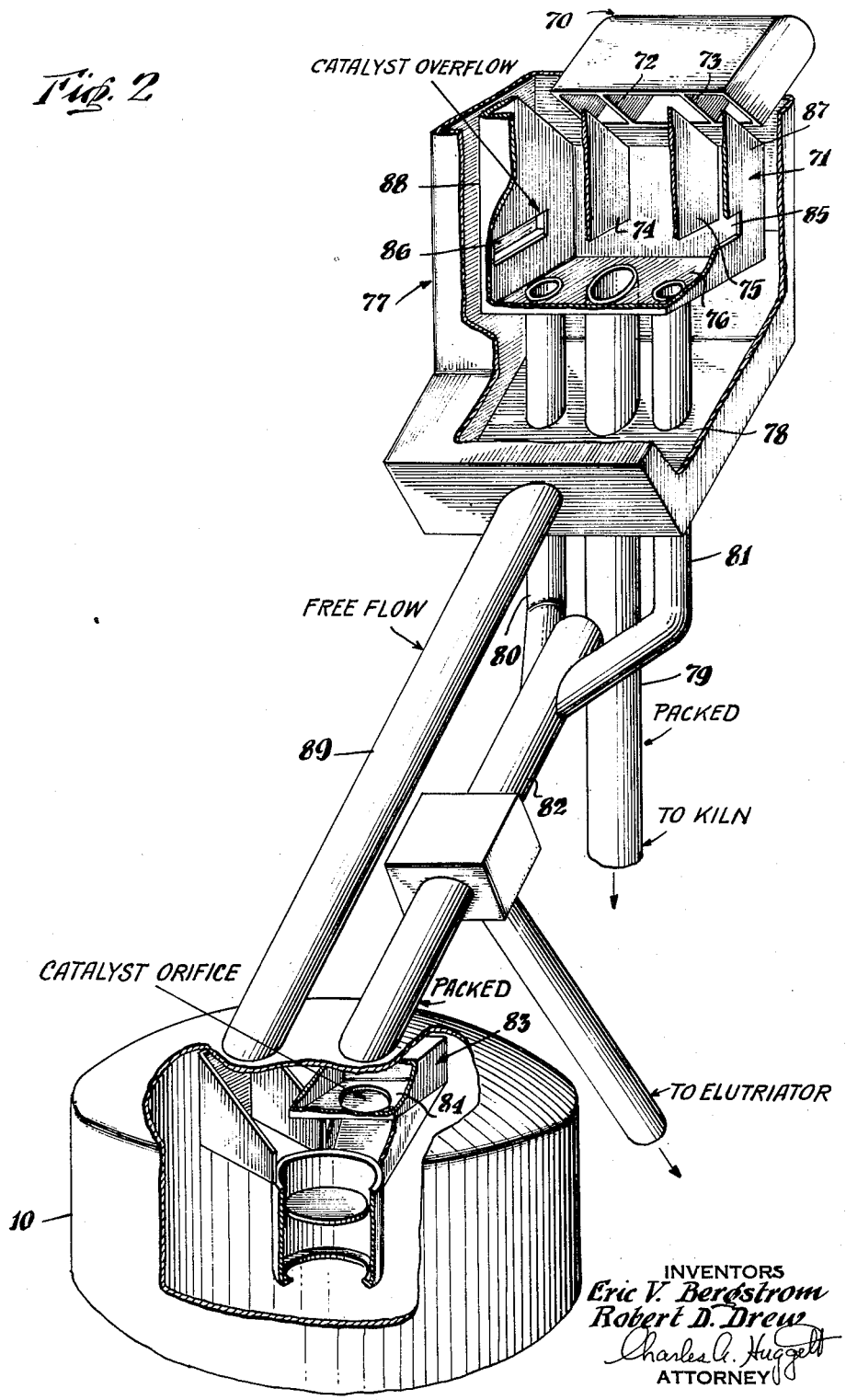

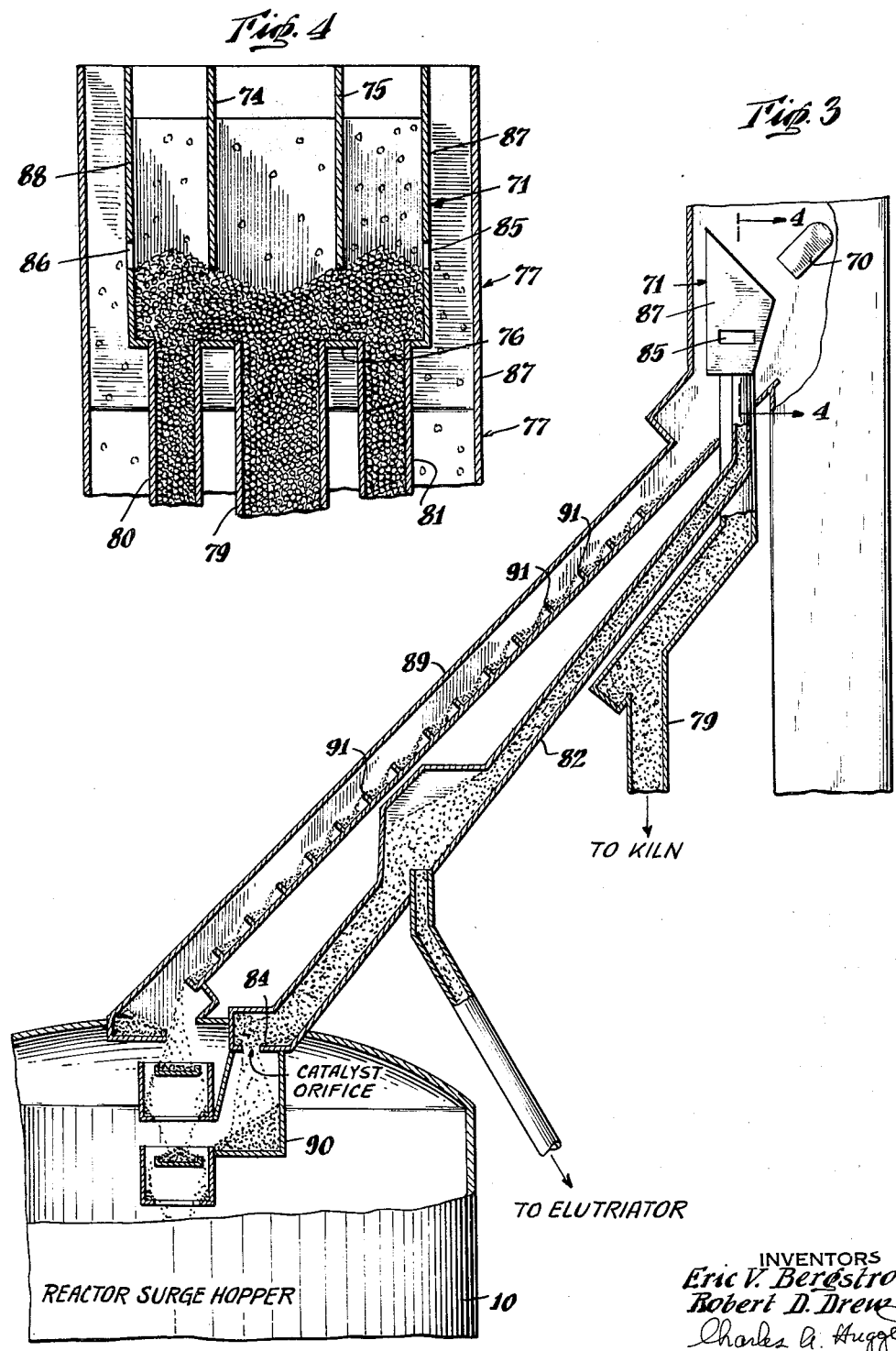

2,941,874

CATALYST TRANSFER APPARATUS IN MOVING BED SYSTEM

Eric V. Bergstrom, Short Hills, and Robert D. Drew, Wenonah, N.J., assignors to Socony Mobil Oil Company, Inc., a corporation of New York Filed Apr. 8, 1957, Ser. No. 651,353

3 Claims. (Cl. 23—288)

This invention relates to an improved apparatus for use in the transfer system of a moving bed process. It particularly relates to improved apparatus for use in a moving bed reforming process in which the solid catalyst is transferred downwardly as a compact gravitating bed through a reaction vessel and through a kiln and, further, in which a portion of the freshly regenerated catalyst is mixed with the spent catalyst transferred to the top of the kiln in correct proportions to control catalyst temperature.

Various types of moving bed processes have been used in the past such as the TCC process for cracking heavy gas oils to produce increased quantities of gasoline, various types of high-temperature or pyrolytic cracking processes in which an inert material is used cyclically to transfer heat to the reaction zone, and various reforming processes in which a gasoline is contacted with a suitable catalyst to provide a rearrangement of the molecules, which thereby produces an improved fuel.

In these moving bed processes the catalyst is transferred at elevated temperature downwardly as a compact mass through the reaction zone, where it is contacted by the reactants in suitable form and at suitable temperature. The temperature is generally quite high, such as, for example, 800°–1000° F. As a result of the reactions which occur in the reaction zone, a carbonaceous deposit is formed on and within the pores of the catalyst and this deposit must be removed. The particles are therefore transferred to a kiln and passed downwardly as a compact gravitating mass through the kiln, where they are contacted with air and the carbonaceous deposits are burned. There is always present in this burning operation the danger that the temperature of the catalyst may become excessive, with a result that the catalytic activity of the catalyst particles is impaired.

Various types of temperature control methods have been practiced in the kiln to prevent the catalyst temperature from rising above the heat damaging level. Many moving bed units in commercial operation have used heat transfer tubes imbedded in the moving mass of particles through which a heat transfer material is passed to absorb a sufficient amount of heat to prevent excessive temperatures. This type of cooling apparatus, while effective for its purpose, has certain disadvantages. From time to time the cooling apparatus develops cracks which cause cooling fluid to be discharged into the regeneration zone and into contact with the catalyst. This results in damage to the catalyst and, hence, the unit must be stopped and repairs made to the apparatus. This is particularly true if heat transfer coils are put into and out of service as a means of temperature adjustment. Other difficulties have been experienced with this type of heat control apparatus.

Recently Thermofor continuous reforming units were placed in commercial operation in which temperature adjustment is obtained in the kiln without placing cooling coils in and out of service. In this system, a portion of the regenerated catalyst taken from the bottom of the kiln is mingled with the spent catalyst removed from the reactor, and this mixture of regenerated and spent catalyst is then passed downwardly through the kiln. By using a sufficient amount of the regenerated catalyst, the maximum temperature reached in the kiln can be readily controlled below the heat damaging level. It is essential in the operation of this apparatus that only a sufficient amount of the regenerated catalyst be used with the spent catalyst to provide the desired temperature control. Of course, if an excessive amount of the regenerated catalyst is used, the temperature reached in the kiln will be too low for practical regeneration rates and, furthermore, an excessive amount of work will be expended in merely moving regenerated catalyst through the kiln. If too little regenerated catalyst is mixed, however, with the spent catalyst, the desired temperature control may not be reached and the catalyst may be heat damaged in the kiln.

The object of this invention is to provide an improved trouble-free apparatus for commingling the correct amount of regenerated catalyst with the spent catalyst for transfer to the kiln, and transferring the remainder of the regenerated catalyst downwardly to the reactor without excessive free fall and damage.

A further object of this invention is to overcome the difficulties hereinabove described in insuring that the correct amount of regenerated catalyst is mixed with the spent catalyst to provide proper temperature control in the kiln.

These and other objects will become obvious upon a study of the following detailed description of the invention and the drawings which are attached hereto.

Figure 1 is a diagrammatic view in vertical elevation of a complete Thermofor continuous reforming system.

Figure 2 is an isometric view partially cut away showing the apparatus for mixing regenerated and unregenerated catalyst for transfer to the kiln and showing the transfer arrangement for the remainder of the regenerated catalyst with minimum breakage.

Figure 3 shows a portion of the catalytic transfer system in vertical elevation with a portion of the view being sectioned.

Figure 4 is a vertical elevation of the catalyst transfer apparatus shown in enlargement as seen on plane 4—4 of Figure 3.

These views are highly diagrammatic in form and are intended for illustration of the invention only.

Referring now to Figure 1, the complete moving bed reforming system is shown diagrammatically. The catalyst is introduced into a reactor surge hopper 10 to form a compact mass therein. This catalyst is periodically withdrawn from the bottom of this surge hopper through a conduit 11 when the valve 12 in conduit 11 is in the open position. When the catalyst pressure sphere 13 is full, the valve 12 is closed and valve 14 in conduit 15 is opened to introduce the catalyst into the reactor 22. A suitable inert gas pressuring system is provided to prevent the escape of reactants from the reaction zone.

The catalyst is gravitated downwardly through the reactor 22 in a substantially continuous manner as a compact mass. Reactants, such as low octane naphtha in vapor form, are introduced into the reactor 22 through the conduit 23 and they travel downwardly through the voids in the catalyst bed. Converted products, such as high octane naphtha, are removed from the lower portion of the reactor through the conduit 24. The pressure in the reactor is adjusted to that found most suitable for the desired products. This may be 100–200 p.s.i. (gauge). The temperature is also adjusted to a suitable value, such as 800°–1000° F. Hydrogen may be introduced with the reactants to enter into the conversion reaction.

The catalyst is withdrawn from the bottom of the reactor continuously through the conduit 25 to the disengager 26 and inert sealing gas, introduced into the bottom of the reactor through the conduit 27, travels concurrently with the catalyst through the conduit 25 and disengages in the disengager 26, thereby substantially reducing the pressure on the catalyst. The catalyst, substantially at atmospheric pressure, is withdrawn from the bottom of the disengager through the conduit 27 and introduced into the center portion of a bucket elevator 28. This bucket elevator is a continuously moving mechanical elevator having buckets divided into three separate portions by vertical dividers. The valve 29 in conduit 27 is generally left in the open position but is provided for emergency shutdown purposes when it is desirable to stop the flow of catalyst from the disengager.

The spent catalyst is discharged from the top of the elevator into the center section of an open-topped, box member diagrammatically illustrated at Detail 30. The spent catalyst is then withdrawn from the bottom of this box member through conduit 31 and connecting conduit 32 to a gas purge hopper 33. This catalyst is then withdrawn through a conduit 34 into a preferential flow box 35 where it is commingled from time to time with catalyst drawn directly from the reactor surge hopper 10 through the conduit 36 when the valve 37 in line 36 is in the open position. These combined streams of catalyst are then withdrawn from the preferential flow box 35 through the conduit 38 and charged into the top of the kiln 39 through the depending conduits 40 and 41. The conduits 40 and 41 terminate within a mechanically rotating assembly 42 which is adapted to provide uniform distribution of the catalyst across the kiln 39.

The catalyst introduced into the kiln travels downwardly as a substantially compact gravitating mass. In the upper portion of the kiln, air is introduced through the conduit 20 to contact the catalyst and effectively burn the carbonaceous deposits from the spent catalyst. A sufficient amount of the regenerated catalyst is commingled with the spent catalyst to prevent the formation of excessive temperatures in the gravitating bed within the kiln which would exceed the heat damaging level of this catalyst. At temperatures in excess of about 1200°–1300° F. the catalyst tends to lose its catalytic reforming activity or strength or both. (The actual temperature at which damage occurs depends on the nature of the catalyst and the time of catalyst exposure as well as other factors.) The combustion gases formed during the burning of the carbonaceous deposits are removed from the lower section of the kiln through the conduits 43, 43 at a controlled rate determined by the position of the valves 44, 44. The rate of gas flow through the kiln may similarly be controlled by adjustment of valves in the gas inlet line 20 and it may in many instances be more desirable to control gas flow through the kiln by adjustment of this valve rather than by adjustment of valves 44, 44 in gas outlet lines 43, 43. It is understood, of course, that the single zone kiln here depicted may be replaced by a multi-zone kiln and it is further understood that some of the heat generated in the kiln may be removed by the use of indirect heat exchanger coils located in the kiln. It is desirable, however, if indirect heat transfer coils are used that they be operated on a continuous basis in order to avoid mechanical failure. Of course, if desired, the direction of flow of the regeneration gas can be reversed or the kiln modified in other ways, such as, for instance, the use of several superimposed zones in place of the single zone illustrated.

The regenerated catalyst is withdrawn from the bottom of the kiln through the conduit 45 and charged through the conduits 46, 47 into the outer sections of the three sectioned buckets of the continuous bucket elevator 28.

The regenerated catalyst is discharged from the top of the elevator into the open-topped, box members diagrammatically illustrated as Details 48 and 49. Portions of this regenerated catalyst are withdrawn from the bottom of these members 48, 49 through conduits 50 and 51 to combine with the spent catalyst gravitating through conduit 31 to provide a mixed stream of regenerated and spent catalyst in conduit 32 which, as previously described, is introduced into the kiln 39. The remainder of the regenerated catalyst is taken from the box members 48, 49 through conduits 52, 53 and 54 as a compact flowing stream which is charged into the top of the reactor surge hopper 10. A small overflow portion of the regenerated catalyst passes from the box members 48, 49 through the conduits 55, 56 and travels through the conduit 57 in free flowing form and is discharged freely into the top of the reactor surge hopper 10.

This description given hereinbove completes the major path of catalyst flow through the system. Various other minor streams of catalysts flow in various paths for specific reasons. For instance, a small flow of catalyst is passed through the conduit 58 from the reactor hopper and through the conduits 59 and 60 to be discharged against the inner walls of the kiln 39. Because the catalyst flows slowly in contact with or near to the kiln walls, there is an increase in temperature of the catalyst near the walls, which is detrimental to the catalyst and to the kiln walls. In order to prevent this, the small flow of regenerated catalyst introduced through the conduits 59 and 60 flows against the walls of the kiln 39, thereby preventing spent catalyst from coming in close association with the inner walls of the kiln. It has been found that this effectively reduces the temperature of the kiln walls.

Another minor stream of catalyst is withdrawn from the bottom of the sloping conduit 54 through the conduit 61 to pass through the elutriator 62. In moving bed systems of this type it has been found that some breakage or attrition of the catalyst occurs with the development of small fine particles in the system. These particles tend to plug the void spaces in the catalyst bed and make gas flow through the bed irregular and uneven. This produces many undesirable features in the system. For instance, an excessive amount of fines in the catalyst bed makes it necessary to increase the pressure drop across the bed in order to get the desired amount of vapors through the bed. Therefore, the catalyst passing through the conduit 61 is dropped through the elutriator countercurrently to a rising stream of gas. The upward gas velocity is adjusted to remove from the falling catalyst the fine particles, and these are taken with the gas to a cyclone separator 63. The fines are dropped from the separator 63 through the conduit 21 into a fines bin and removed therefrom at intervals.

It is essential in moving bed systems to prevent the excessive accumulation of fine particles in the moving mass of particles. These particles plug the void spaces in the beds and make it difficult to get proper flow of gases or vapors through the beds. It is customary to pass a small portion of the catalyst inventory through an elutriator or fines removal zone, as previously described. One of the features of this invention is the development of a stream of catalyst for passage to the elutriator which is richer in fines than the normal stream of catalyst flowing through the reaction vessels.

As the particles flow from the vessel 77 through the conduits 79, 80 and 82 in compact flowing form, the fines are locked in position between the packed granular particles and flow downwardly in fixed relationship with these granular particles. (See Figures 2 and 3.) In order to cause the fines to accumulate the chamber 19 is located in the conduit 82, having an enlarged top which projects above the roof line of the sloping conduit 82. The shape of the chamber is such that a free space 18 is provided, the particles forming a surface at the angle of repose of the flowing material. For granular catalyst this is generally an angle of about 30 degrees with the horizontal. This, in effect, releases the particles from tight confinement and allows the granular particles to roll across the surface formed in the chamber 19. Furthermore, the bed tends to loosen sufficiently in this chamber to enable the fine particles to gravitate downwardly between the particles to the floor of the chamber. Hence, the stream of catalyst withdrawn through the conduit 61 attached to the floor of the chamber 19 is substantially richer in fines than the stream passing through the conduit 82. This means that the catalyst stream in conduit 82 below the chamber 19 has substantially less fines than the stream in conduit 82 above the chamber 19. This, of course, is highly desirable.

A fresh catalyst elevator 65 is used to elevate a new supply of catalyst for the system and this fresh catalyst may be introduced into the system through the conduits 66, 67 and 68 or alternatively may be introduced into the fresh catalyst bin through the conduits 66 and 69. Catalyst in the fresh bin may be introduced into the system when desired to replenish the catalyst inventory. As depicted, the fines bin is a separated portion of the fresh catalyst bin 64, being the upper portion thereof.

Referring now to Figure 2, the details of this invention will be disclosed more clearly. Figure 2 shows the upper catalyst transfer system from the top of the elevator 28 to the top of the reactor surge hopper 10. For instance, one of the elevator buckets, Detail 70, is shown emptying into the open-topped box member 71. The bucket 70 is seen to be divided into three sections by the vertical separators 72, 73. Similarly, the open-topped box member 71 is divided into three sections corresponding to the three sections of the bucket by the vertical separators 74, 75. It is noted that these vertical separators 74, 75 terminate at their lower ends a substantial distance above the bottom 76 of the open-topped box member 71. The open-topped box member 71 is seen to be located centrally within a catalyst hopper 77 which is actually a part of the top of the elevator 28 and in open communication with the buckets of the elevators as these buckets round the top sprocket of the elevator. The floor 76 of the open-topped box member is terminated a substantial distance above the floor 78 of the hopper 77. As previously indicated, the regenerated catalyst is located in the two outer compartments of the buckets and, hence, empties into the two outer compartments of the open-topped box member. The spent catalyst is located in the central compartment of the bucket and enters the center compartment of the open-topped box member. The catalyst is withdrawn from the open-topped box member at a low enough rate so that a compact, gravity-flowing mass of catalyst is maintained in each of the three compartments. The spent catalyst is withdrawn downwardly through the conduit 79, which is attached at its upper end to the floor of the open-topped box member below the center compartment. This conduit 79 connects at its lower end to the top of the kiln and takes the place of or is equivalent to that transfer system described with respect to Figure 1 between the Detail 30 and the top of the kiln. (Conduit 31, conduit 32, conduit 34, conduit 38 and conduits 40 and 41), Figure 1, being highly diagrammatic with respect to the details of catalyst transfer at the top of the elevator.

The flow of catalyst through the conduit 79 is adjusted so that there is a greater flow of catalyst through the kiln than through the reactor by the amount needed to maintain proper catalyst temperatures in the kiln. The lower edges of the separators 74 and 75 are located at an elevation which will permit a sufficient lateral flow of regenerated catalyst from the outer compartments to commingle with the spent catalyst in the center compartment in the proper ratio to provide kiln temperature control. By this arrangement the ratio of regenerated to spent catalyst transferred to the kiln is automatically maintained at that ratio required to prevent catalyst temperature in the kiln from exceeding the heat damaging level but without providing to the kiln an excessive amount of regenerated catalyst which would cause the temperature in the kiln to drop too low and cause the combustion rate to drop below practical burning rates. Conduits 80 and 81 are located directly below the outer compartments and are attached at their upper ends to the floor 76 of the open-topped box member. Compact streams of regenerated catalyst are withdrawn through conduits 80 and 81 and combined to flow through the conduit 82 into the top of the reactor surge hopper 10. In order to maintain the flow of catalyst through these pipes in compact, gravity-flowing form, a box 83 is located just below the lower end of the conduit 82. The floor 84 of this box 83 has an aperture within it and serves as a flow control orifice. The size of the aperture in the floor 84 is adjusted to give the desired flow rate of catalyst through the conduits 80, 81 and 82. This floor may be arranged in the form of a slide valve with a series of sized apertures whereby selected flow rates may be obtained. This flow rate is adjusted so that substantially all of the regenerated catalyst will pass either through the conduits 80 and 81, located beneath the outer compartments, or through the central conduit 79, leaving only a small amount of catalyst entering the open-topped box member unaccounted for. The level of catalyst in the outer compartments will build up, therefore, until the apertures 85 and 86 are reached in the side walls 87 and 88 of the open-topped box member. This small amount of excess catalyst will then flow through these apertures and drop in free fall to the floor 78 of the hopper 77. This free flowing catalyst stream drains from the bottom of the hopper 77 through the conduit 89 and flows freely into the top of the reactor surge hopper 10. It is seen that by proper adjustment of the size of the orifice in the floor 84 located beneath the catalyst transfer pipe 82, substantially all of the catalyst flow from the hopper 77 either to the kiln or to the reactor may be maintained in compact, gravity-flowing form rather than falling freely. It has been found that when catalyst is lowered substantial distances as a compact gravity flowing bed, the breakage of the catalyst is materially less than if the catalyst falls freely for any substantial distance and then has its fall interrupted either by a bed of catalyst or a metal surface on which it lands. Since the catalyst is expensive and the removal of catalyst fines from the system is complicated, it is highly desirable to prevent the catalyst from breaking to any substantial extent.

Figure 3 shows in highly diagrammatic form a side view of the apparatus depicted on Figure 2. The bucket 70 is seen dumping its catalyst load into the open-topped box member 71. The overflow aperture 85 in the side wall 87 of the open-topped box member 71 is shown in the side view on Figure 3. The conduit 82 is shown transferring the catalyst from the bottom of the boxed member 71 in compact flowing form downwardly to the reactor surge hopper 10. The orifice plate 84 is seen to maintain the catalyst above the plate in compact form, and below this orifice plate the catalyst falls freely through the easy let down system 90 which transfers the catalyst into the center of the reactor surge hopper 10. The overflow of catalyst passed through the aperture 85 is seen on Figure 3 as traveling in free flowing form along the floor of the conduit 89. A series of dams 91 is located in spaced relationship along the floor of the conduit 89 so as to retain on the floor of the conduit a substantially continuous bed of static catalyst. The moving catalyst, therefore, passes over the static bed of catalyst and makes contact with catalyst rather than with the metal. This results in less wear and tear on the floor of the conduit 89. These dams also provide a series of beds of catalyst at staged elevations and the particles cascade from bed to bed. This breaks the fall of the catalyst particle and tends to minimize attrition of the catalyst. The free-falling catalyst enters the top of the reactor surge vessel 10 at the lower end of the conduit 89 and drops through the easy let down system 90 to enter the central region of the vessel and subsequently lands on the surface of the catalyst bed in the reactor surge hopper. The gravity flowing stream of spent catalyst withdrawn from the central compartment of the open-topped box member 71 is depicted on Figure 3 as passing in compact gravitating form through the conduit 79. With the spent catalyst passing through the conduit 79, as previously described, flows a measured amount of regenerated catalyst. The mixing of the spent and regenerated catalyst streams cannot be seen on Figure 3, but an enlarged detailed view of the mixing arrangement is shown in highly diagrammatic form on Figure 4. As is seen on Figure 4, the buckets empty the catalyst and the catalyst falls freely into the three compartments. The flow of catalyst through the conduit 79, while in compact flowing form, would be at a flow rate greater than supplied in the center compartment and the level of the compact bed of catalyst in the open-topped box member 71 would fall below the floor 76 of the open-topped box member but for the fact that the vertical separators 74 and 75 are adjusted to allow catalyst to flow from the outer compartments to commingle with catalyst in the center compartment. This therefore maintains the level of catalyst in the center compartment at the lower end of the vertical separators 74 and 75. As is seen, the flow of catalyst entering the outer compartments would be more than sufficient to maintain the gravity-flowing compact streams of catalyst withdrawn from the outer compartments through the conduits 80 and 81 and therefore the level of the catalyst in the outer compartments would rise but for the windows 85 and 86 which permit the excess catalyst to flow out of the box member and to fall freely in the hopper 77. This arrangement, therefore, prevents the catalyst level from falling in the three compartments but also prevents the catalyst level from rising to such a level that catalyst would flow back into the elevator. It is essential to prevent catalyst from flooding back into the elevator since this would tend to jam the elevator and seriously interfere with its proper operation.

*Example I*

The invention was successfully incorporated in a continuous commercially operating moving bed reforming system, and it is continuing to operate successfully with the following operating conditions.

Catalyst flow through reactor — 25 to 40 tons/hr. (26 tons/hr. regularly with 0.05% wt. of carbon).
Spent catalyst (center section of elevator) — 25 to 40 tons/hr. (25 tons/hr. regularly with 4.00% wt. of carbon).
Catalyst flow to kiln — 55 to 90 tons/hr. (60 tons/hr. r e g u l a r l y mixed as follows: 25 tons/hr. with 4.00% wt. of carbon and 35 tons/hr. with 0.05% wt. of carbon).
Catalyst flow to interior kiln walls — About 4 to 6 tons/hr. (C=0.05%).
Catalyst in compact flow to reactor surge hopper — 25 to 40 tons/hr. (regularly 25 tons/hr.).
Catalyst in free fall to reactor surge hopper — About 5 tons/hr.
Elutriator supply line — Generally about 7 tons/hr.

The catalyst used is a reforming catalyst of chromia on alumina and a size range of 4-12 mesh Tyler.

The detailed description and illustration of the invention is given solely to provide a better understanding of the invention and is not intended as a limitation of the scope of the invention. The only limitations intended are found in the appended claims.

We claim:

1. In a moving bed hydrocarbon conversion system in which a granular contact material is passed through a reactor where it is contacted with hydrocarbons and then through a kiln where contaminants are burned from the contact material and in which a controlled amount of the clean contact material is recycled to the kiln commingled with the contact material from the reactor so as to prevent excessive temperature in the kiln, improved apparatus for supplying the contact material to the reactor and to the kiln comprising: a hopper located a substantial distance above the reactor and kiln, means supplying three separated streams of contact material to said hopper, the middle streams being spent contact material from the reactor and the outer streams being regenerated contact material from the kiln, means for maintaining the streams of contact material separated within the hopper comprising an open-topped box member, vertical separators within the box member, adapted to laterally confine the separated streams of contact material, said vertical separators terminated at their lower ends a substantial distance above the bottom of the box, whereby contact material from the two outer streams flows under the vertical separators to commingle with the middle stream in amounts sufficient to provide kiln temperature control, means defining apertures in the side walls of the box and adjacent the two outer streams, whereby excess contact material in the two outer streams can flow through the apertures to fall to the floor of the hopper, a first and second conduit located below the outer streams of contact material attached to the floor of the box member at their upper ends and communicating with a third conduit at their lower ends, a reactor surge chamber located about the lower end of said third conduit, flow restricting means associated with the lower end of said third conduit for maintaining compact flow of contact material in said first, second and third conduits, a fourth conduit located below the middle stream of contact material and attached at its upper end to the floor of the box member and at its lower end to the kiln, a fifth conduit connected at its upper end to the bottom of the hopper and at its lower end to the reactor surge chamber whereby the mixing of regenerated and spent contact material for supply to the kiln is automatically effected, and the major portion of the contact material transferred to the reactor is lowered in compact gravitating form with minimum attrition of the contact material.

2. Claim 1 further characterized in the use of a continuous bucket elevator having compartmented buckets, with the middle stream of contact material supplied by the center compartment of the buckets of the elevator and the outer streams of contact material supplied by the outer compartments of the buckets of the continuous bucket elevator.

3. Claim 1 further characterized in that the fifth conduit carrying free flowing contact material from the hopper to the reactor surge chamber is located substantially less than vertical with the horizontal but at a sufficient angle with the horizontal to provide easy flow of the contact material, and having on the floor of said fifth conduit a series of lateral dams located sufficiently close to provide a substantially static bed of contact material on the floor of said conduit, whereby wear of the floor of the fifth conduit is minimized.

(References on following page)

References Cited in the file of this patent

UNITED STATES PATENTS

| | | |
|---|---|---|
| 2,490,774 | Bland | Dec. 13, 1949 |
| 2,494,794 | Bonnell | Jan. 17, 1950 |
| 2,531,192 | Bergstrom | Nov. 21, 1950 |
| 2,570,363 | Mercier | Oct. 9, 1951 |
| 2,626,205 | Watson | Jan. 20, 1953 |
| 2,695,815 | Bergstrom | Nov. 30, 1954 |
| 2,772,216 | Elliott | Nov. 27, 1956 |
| 2,783,099 | Bergstrom | Feb. 26, 1957 |